(12) United States Patent
Gao et al.

(10) Patent No.: US 10,735,345 B2
(45) Date of Patent: *Aug. 4, 2020

(54) ORCHESTRATING COMPUTING RESOURCES BETWEEN DIFFERENT COMPUTING ENVIRONMENTS

(71) Applicant: INTERNATIONAL BUSINESS MACHINES CORPORATION, Armonk, NY (US)

(72) Inventors: Xue Feng Gao, Haidian District (CN); Hui Qing Shi, Haidian District (CN); Qing Feng Zhang, Chanping District (CN); Zhi Feng Zhao, Wuhan (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,331

(22) Filed: Nov. 26, 2018

(65) Prior Publication Data

US 2019/0097942 A1 Mar. 28, 2019

Related U.S. Application Data

(63) Continuation of application No. 15/489,901, filed on Apr. 18, 2017, now Pat. No. 10,171,377.

(51) Int. Cl.
*H04L 12/911* (2013.01)
*H04L 12/24* (2006.01)
(Continued)

(52) U.S. Cl.
CPC ............ *H04L 47/788* (2013.01); *H04L 41/12* (2013.01); *H04L 43/0876* (2013.01);
(Continued)

(58) Field of Classification Search
CPC ... H04L 47/788; H04L 67/00; H04L 43/0876; H04L 41/5077
See application file for complete search history.

(56) References Cited

U.S. PATENT DOCUMENTS

| 8,806,015 B2 | 8/2014 | Dutta et al. |
| 9,250,863 B1 | 2/2016 | Vincent et al. |

(Continued)

FOREIGN PATENT DOCUMENTS

| CN | 103186423 | 7/2013 |
| EP | 3032417 | 6/2016 |

(Continued)

OTHER PUBLICATIONS

Singh, Abhilasha; A Simulation Based Analysis and Modeling of Workload Patterns using the CloudSim Toolkit; International Journal of Scientific Engineering and Research; vol. 3 Issue 7, Jul. 2015; pp. 36-40.

(Continued)

*Primary Examiner* — Alina A Boutah
(74) *Attorney, Agent, or Firm* — Schmeiser, Olsen & Watts; Mark C. Vallone

(57) ABSTRACT

An approach is provided for orchestrating computing resources between different computing environments. Data from first and second computing environments is monitored. The data specifies utilization of infrastructure, middleware, software testing tools, integrated development environments (IDEs), relationships among nodes, utilization of the nodes, and user behavior in the first and second computing environments. Based on the utilization of the infrastructure, middleware, tools, IDEs, node relationships and utilization, and user behavior, a pattern decision tree is updated, and unbalanced workloads are identified. Based on a comparison of the unbalanced workloads to patterns in the updated pattern decision tree, an orchestration topology is generated (Continued)

that specifies a new placement of the computing resources in the first and second computing environments. Based on the orchestration topology, computing resource(s) are automatically deployed in the first computing environment and other computing resource(s) are automatically deployed in the second computing environment.

20 Claims, 5 Drawing Sheets

(51) Int. Cl.
    *H04L 12/26*     (2006.01)
    *H04L 29/08*     (2006.01)

(52) U.S. Cl.
    CPC .............. *H04L 43/16* (2013.01); *H04L 67/10* (2013.01); *H04L 41/5077* (2013.01)

(56) References Cited

U.S. PATENT DOCUMENTS

| | | | | |
|---|---|---|---|---|
| 2007/0233698 | A1* | 10/2007 | Sundar | G06F 8/60 |
| 2012/0303606 | A1* | 11/2012 | Cai | G06F 16/951 |
| | | | | 707/709 |
| 2012/0311614 | A1* | 12/2012 | Deanna | H04L 67/10 |
| | | | | 719/328 |
| 2014/0129719 | A1* | 5/2014 | Weber | H04L 47/823 |
| | | | | 709/226 |
| 2014/0298091 | A1* | 10/2014 | Carlen | H04L 65/80 |
| | | | | 714/15 |
| 2015/0074279 | A1* | 3/2015 | Maes | G06F 9/5072 |
| | | | | 709/226 |
| 2015/0081885 | A1* | 3/2015 | Thomas | G06F 9/45558 |
| | | | | 709/224 |
| 2015/0082432 | A1* | 3/2015 | Eaton | H04L 47/785 |
| | | | | 726/23 |
| 2016/0043970 | A1* | 2/2016 | Jacob | H04L 47/828 |
| | | | | 709/226 |
| 2016/0065417 | A1* | 3/2016 | Sapuram | G06Q 30/0631 |
| | | | | 709/223 |
| 2016/0350173 | A1* | 12/2016 | Ahad | H04L 67/02 |
| 2017/0132853 | A1* | 5/2017 | Matos | G07C 5/008 |
| 2017/0244787 | A1* | 8/2017 | Rangasamy | H04L 41/0654 |
| 2017/0251013 | A1* | 8/2017 | Kirti | H04L 63/1416 |
| 2017/0257432 | A1* | 9/2017 | Fu | G06F 9/5072 |
| 2018/0024860 | A1* | 1/2018 | Balle | G06F 3/0647 |
| | | | | 718/104 |
| 2018/0026911 | A1* | 1/2018 | Anholt | H04L 12/4641 |
| | | | | 709/226 |
| 2018/0048716 | A1* | 2/2018 | Madhayyan | G06F 9/45558 |
| 2018/0102985 | A1* | 4/2018 | Byers | H04L 47/823 |
| 2018/0205616 | A1* | 7/2018 | Liu | H04L 41/145 |
| 2018/0302335 | A1 | 10/2018 | Gao | |

FOREIGN PATENT DOCUMENTS

| | | |
|---|---|---|
| WO | 2013185175 | 12/2013 |
| WO | 2015197564 | 12/2015 |

OTHER PUBLICATIONS

Zhang, Xiaodong et al.; A Relationship-based VM Placement Framework of Cloud Environment; 2013 IEEE 37th Annual Computer Software and Applications Conference; Jul. 22-26, 2013; pp. 124-133.

Syta, James M.; List of IBM Patents or Patent Applications Treated as Related; Nov. 26, 2018; 1 page.

* cited by examiner

ORCHESTRATING COMPUTING RESOURCES BETWEEN DIFFERENT COMPUTING ENVIRONMENTS

CROSS REFERENCE TO RELATED APPLICATIONS

This application is a continuation application claiming priority to Ser. No. 15/489,901 filed Apr. 18, 2017, now U.S. Pat. No. 10,171,377, issued Jan. 1, 2019 the contents of which are hereby incorporated by reference.

BACKGROUND

The present invention relates to managing computing resources, and more particularly to managing a deployment of computing resources between different cloud technologies.

Cloud providers offer both Infrastructure as a Service (IaaS) and Container as a Service (CaaS) (i.e., Container Cloud) to users. The IaaS is based on bare metal machines or virtual machines (VMs) and the container cloud is based on a container technology. Vendors provide resources from the cloud provider view, rather than from the end user's holistic business view, which results in dispersed VMs and containers set up at discrete cloud areas and an inefficient utilization of infrastructure hardware resources. Known systems provide techniques for implementing IaaS or CaaS orchestration, but do not consider how orchestration patterns are inferred.

A cloud provider can monitor and identify under-utilized VMs in an IaaS cloud, but it is difficult to shift the workload to a CaaS cloud. Further, when the monitoring by the cloud provider identifies over-utilized containers, there is no easy way to shift the workload to an IaaS cloud. Such difficult workload shifts between different cloud technologies using known techniques require sacrifices in efficiency and cost.

SUMMARY

In one embodiment, the present invention provides a method of orchestrating computing resources between different computing environments. The method includes a computer monitoring data from a first computing environment and a second computing environment. The data specifies a utilization of infrastructure of the first and second computing environments, middleware running on the first and second computing environments, software testing tools running on the first and second computing environments, integrated development environments (IDEs) running on the first and second computing environments, relationships among nodes of the first and second computing environments and utilization of the nodes, and user behavior in the first and second computing environments. The method further includes based on the utilization of the infrastructure, the middleware, the software testing tools, the IDEs, the relationships among the nodes, the utilization of the nodes, and the user behavior, the computer updating a pattern decision tree. The method further includes based on the updated pattern decision tree and a user request that specifies requirements of the computing resources, the computer generating an orchestration topology that specifies a placement of the computing resources in the first and second computing environments. The method further includes based on the orchestration topology, the computer automatically deploying one or more computing resources included in the computing resources in the first computing environment and automatically deploying one or more other computing resources included in the computing resources in the second computing environment.

In another embodiment, the present invention provides a computer program product including a computer readable storage medium and computer readable program code stored in the computer readable storage medium. The computer readable program code contains instructions that are executed by a central processing unit (CPU) of a computer system to implement a method of orchestrating computing resources between different computing environments. The method includes the computer system monitoring data from a first computing environment and a second computing environment. The data specifies a utilization of infrastructure of the first and second computing environments, middleware running on the first and second computing environments, software testing tools running on the first and second computing environments, integrated development environments (IDEs) running on the first and second computing environments, relationships among nodes of the first and second computing environments and utilization of the nodes, and user behavior in the first and second computing environments. The method further includes based on the utilization of the infrastructure, the middleware, the software testing tools, the IDEs, the relationships among the nodes, the utilization of the nodes, and the user behavior, the computer system updating a pattern decision tree. The method further includes based on the updated pattern decision tree and a user request that specifies requirements of the computing resources, the computer system generating an orchestration topology that specifies a placement of the computing resources in the first and second computing environments. The method further includes based on the orchestration topology, the computer system automatically deploying one or more computing resources included in the computing resources in the first computing environment and automatically deploying one or more other computing resources included in the computing resources in the second computing environment.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of orchestrating computing resources between different computing environments. The method includes the computer system monitoring data from a first computing environment and a second computing environment. The data specifies a utilization of infrastructure of the first and second computing environments, middleware running on the first and second computing environments, software testing tools running on the first and second computing environments, integrated development environments (IDEs) running on the first and second computing environments, relationships among nodes of the first and second computing environments and utilization of the nodes, and user behavior in the first and second computing environments. The method further includes based on the utilization of the infrastructure, the middleware, the software testing tools, the IDEs, the relationships among the nodes, the utilization of the nodes, and the user behavior, the computer system updating a pattern decision tree. The method further includes based on the updated pattern decision tree and a user request that specifies requirements of the computing resources, the computer system generating an orchestration topology that specifies a placement of the computing resources in the first and second computing environments. The method further includes based on the orchestration topology, the computer system automatically deploying one or more computing resources included in the computing resources in the first computing environment and automatically deploying one or more other computing resources included in the computing resources in the second computing environment.

Embodiments of the present invention provide computing resource deployment that automatically meets cloud users' business requirements via advanced orchestration crossing IaaS and CaaS clouds. Orchestration patterns and deployment utilities may be generated and optimized through continuous monitoring and analysis of utilization time and user behavior. Embodiments of the present invention sustain a consistently balanced and maximize utilized resource consuming status across IaaS and CaaS clouds. Embodiments of the present invention provide smart orchestration and placement of computing resources, which reduces costs. Cloud resource placement and orchestration efficiency is improved for public, private, and hybrid clouds.

DETAILED DESCRIPTION

Overview

Embodiments of the present invention create a mixed orchestration mechanism which employs machine learning to optimize computing resource deployment between an IaaS cloud and a container cloud (i.e., between an IaaS cloud environment and a CaaS cloud environment). Based on a business analysis of continuous infrastructure monitoring data (i.e., utilization, nodes relationship, middleware, tools, and user behavior), embodiments of the present invention automatically generate and maintain a pattern repository with a self-study pattern decision tree.

In one embodiment, the mixed orchestration mechanism includes a resource monitoring module, a pattern management module, and a placement manager module. The resource monitoring module collects data from IaaS and CaaS clouds, which includes utilization of infrastructure, middleware, tools data, nodes relationship, and user behavior information (e.g., average interval of start/stop, middleware upgrade interval, etc.). The resource monitoring module feeds the collected data to the pattern management module to generate or optimize a deployment pattern, or to place the workload in a location which provides high performance or high resource utilization.

The pattern management module includes a resource analytics component and a pattern repository component. The resource analytics component analyzes historic and continuous user behavior, nodes relationship, and infrastructure utilization data to generate or optimize the patterns in the pattern repository. The pattern repository component maintains the pattern decision tree to ensure its value and utility. The pattern repository component compares end users' new or existing computing resources and their requirements to the pattern decision tree to quickly decide where and how to orchestrate the computing resources between different cloud environments.

The placement manager module generates orchestration topology and configurations (e.g., node 1 on IaaS, IP address, hardware setting, etc.), feeds the topology and configurations to a deployment orchestration module to build images or configuration files (e.g., Docker files), and subsequently invokes a Cloud API or a Container (i.e., Docker) API to deploy the nodes.

System for Orchestrating Computing Resources

Figure 1:
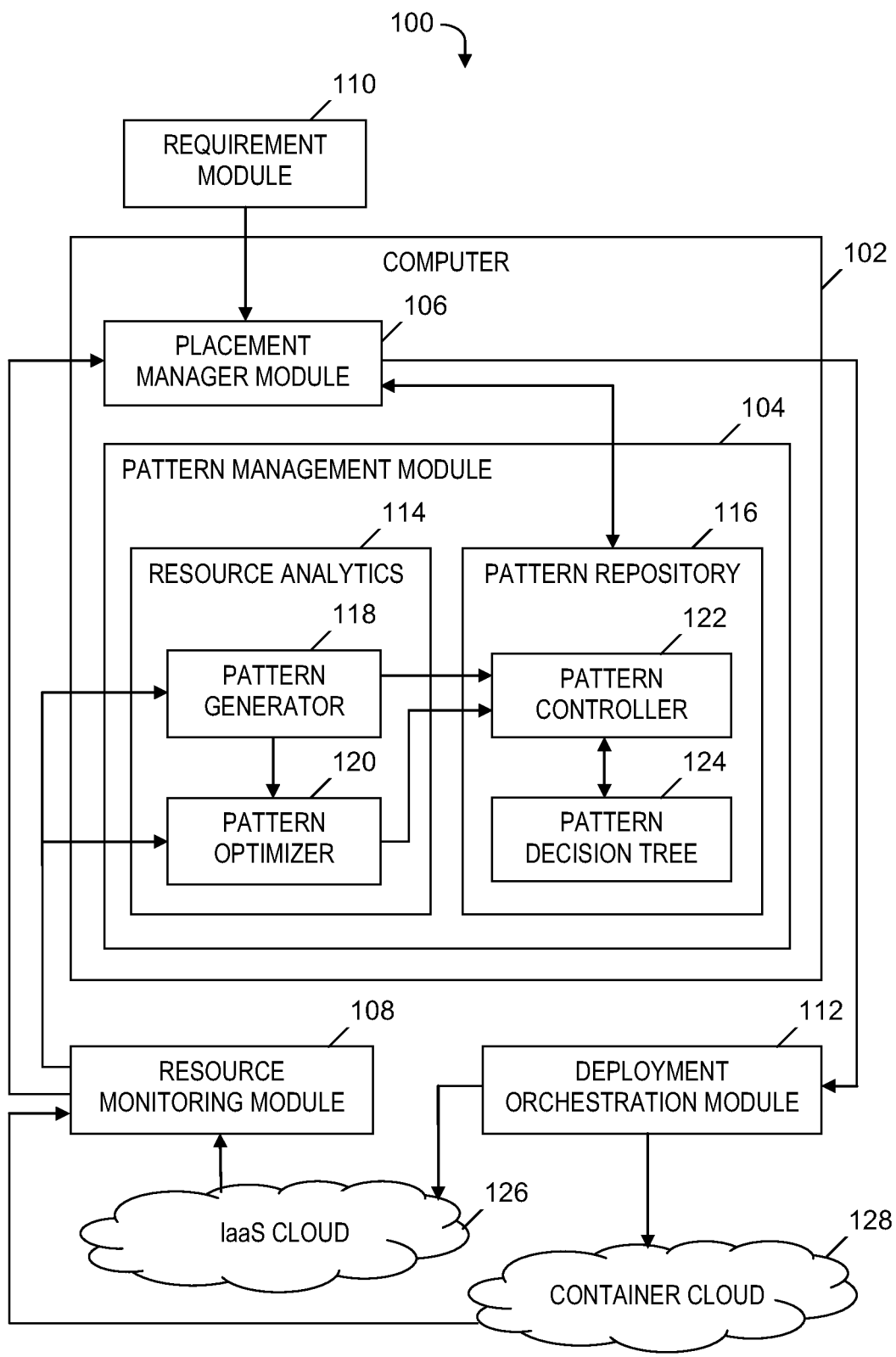
FIG. 1 is a block diagram of a system for orchestrating computing resources between different computing environments, in accordance with embodiments of the present invention.

FIG. 1 is a block diagram of a system 100 for orchestrating computing resources between different computing environments, in accordance with embodiments of the present invention. System 100 includes a computer 102, which executes software-based pattern management module 104 and software-based placement manager module 106. System 100 also includes software-based resource monitoring module 108, requirement module 110, and deployment orchestration module 112.

Pattern management module 104 includes a resource analytics module 114 and a pattern repository 116. Resource analytics module 114 includes a pattern generator 118 and a pattern optimizer 120. Pattern repository 116 includes a pattern controller 122 and a self-study pattern decision tree 124.

Resource monitoring module 108 continuously monitors and collects data from first and second computing environments. In one embodiment, the first and second computing environments are an IaaS cloud 126 and a container cloud 128, respectively. In one embodiment, the monitored and collected data includes specifications of a utilization of infrastructure of IaaS cloud 126 and container cloud 128, middleware running on IaaS cloud 126 and container cloud 128, software testing tools running on IaaS cloud 126 and container cloud 128, relationships among nodes of the IaaS cloud 126 and container cloud 128, and user behavior in IaaS cloud 126 and container cloud 128. In one embodiment, the user behavior includes average intervals of starting and stopping virtual machines (VMs), average interval of application updates, and average interval of communication between connected nodes. Resource monitoring module 108 sends the aforementioned collected data to pattern management module 104 to generate or optimize a deployment pattern, and to placement manager module 106 to place a workload in a correct location to obtain high performance or high resource utilization.

Resource analytics module 114 analyzes the historic and continuous user behavior, nodes relationships, and infrastructure utilization data to generate and optimize patterns of workloads and user behavior in pattern repository 116. Pattern repository 116 maintains pattern decision tree 124 so that an end user's new or existing computing resources may be compared to pattern decision tree 124 to quickly determine where and how to orchestrate the computing resources via a historic learning based decision technique. In one embodiment, orchestrating the computing resources includes orchestrating VMs and containers across IaaS cloud 126 and container cloud 128.

Placement manager module 106 generates an orchestration topology and configurations (e.g., Node1 on IaaS cloud 126, IP Address, hardware setting, etc.), sends the orchestration topology and configurations to deployment orchestration module 112 to build images or configuration files (i.e., Docker files), and subsequently invokes a cloud API or container API (i.e., Docker API) to deploy the nodes (i.e., computing resources) according to the orchestration topology and configurations. In one embodiment, the deployment of the nodes sustains a constantly balanced, maximum utilized resource consuming status across IaaS cloud 126 and container cloud 128. Placement manager module 106 may newly place a computing resource in IaaS cloud 126 or container cloud 128, or may re-locate a computing resource from being placed in IaaS cloud 126 to container cloud 128, or from being placed in container cloud 128 to IaaS cloud 126.

Figure 2:
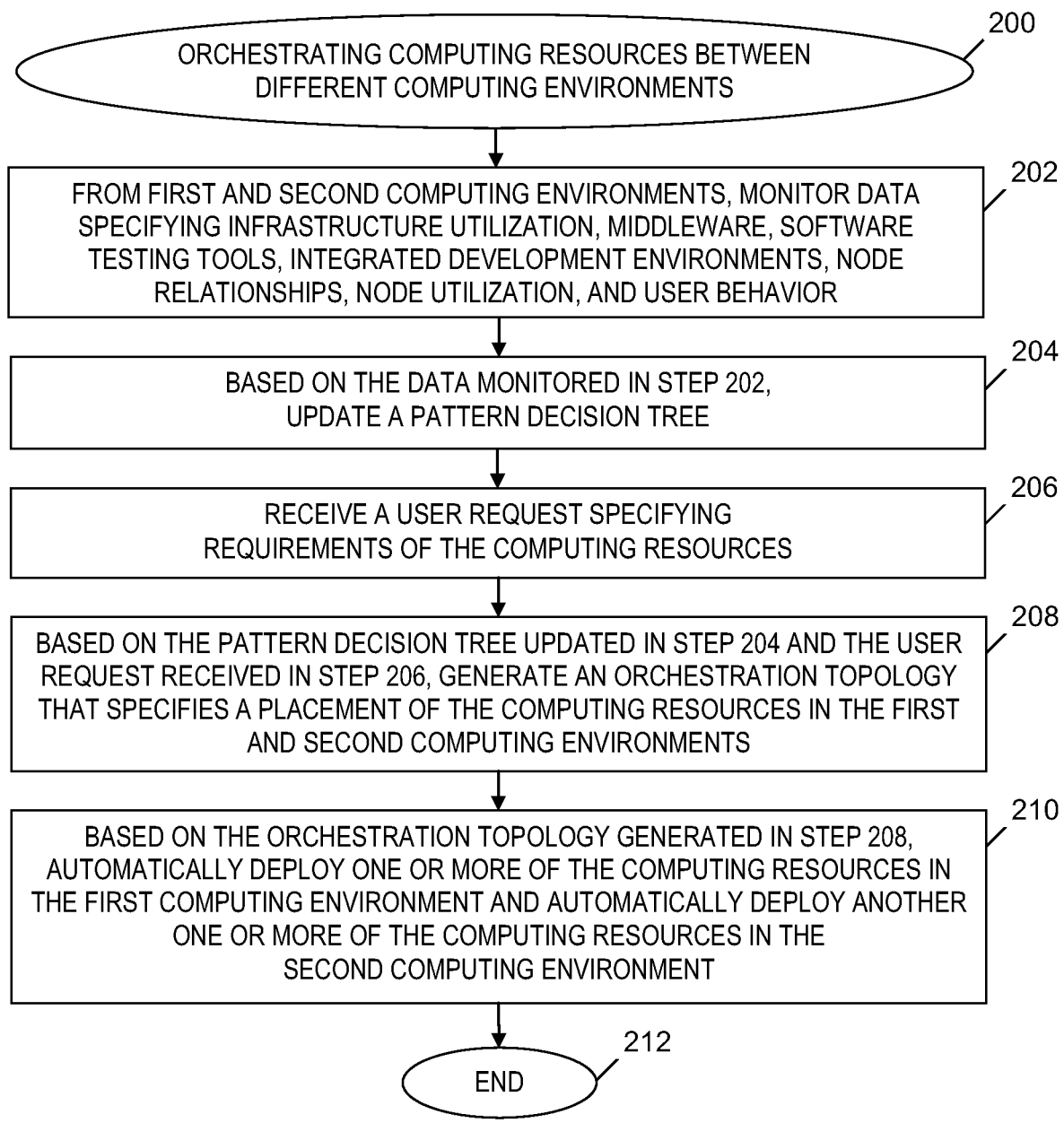
FIG. 2 is a flowchart of a process of orchestrating computing resources between different computing environments, in accordance with embodiments of the present invention.
Figure 4:
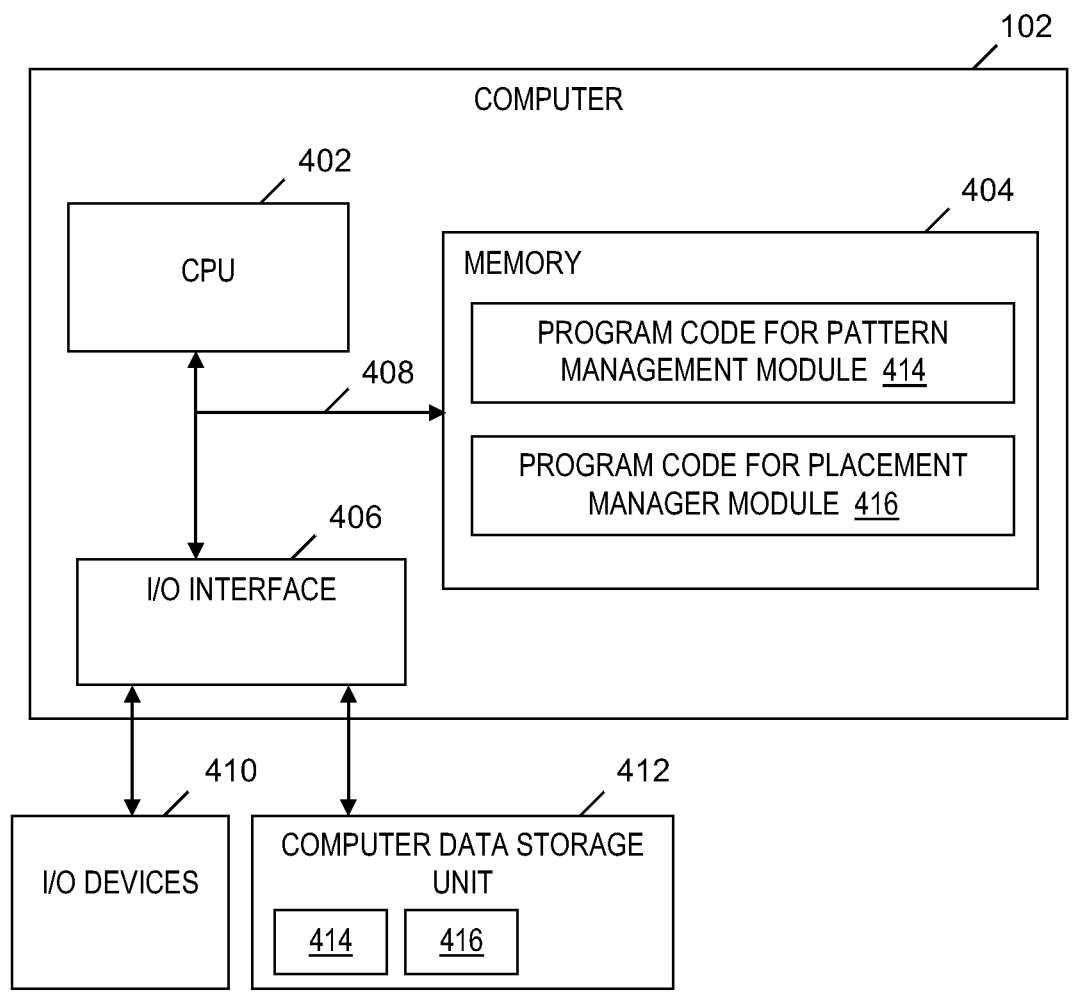
FIG. 4 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 4 presented below.

Process for Orchestrating Computing Resources

FIG. 2 is a flowchart of a process of orchestrating computing resources between different computing environments, in accordance with embodiments of the present invention. The process of FIG. 2 begins at step 200. In step 202, resource monitoring module 108 (see FIG. 1) continuously monitors data from IaaS cloud 126 (see FIG. 1) and container cloud 128 (see FIG. 1). The monitored data specifies (1) a utilization of infrastructure of IaaS cloud 126 (see FIG. 1) and container cloud 128 (see FIG. 1), (2) middleware running on IaaS cloud 126 (see FIG. 1) and middleware running on container cloud 128 (see FIG. 1), (3) software testing tool(s) running on IaaS cloud 126 and software testing tool(s) running on container cloud 128, (4) IDEs running on IaaS cloud 126 (see FIG. 1) and IDEs running on container cloud 128 (see FIG. 1), (5) relationships (i.e., connections) among nodes in IaaS cloud 126 (see FIG. 1) and container cloud 128 (see FIG. 1), and utilization of the nodes, and (6) user behavior in the IaaS cloud 126 (see FIG. 1) and container cloud 128 (see FIG. 1).

In step 202, resource monitoring module 108 (see FIG. 1) may collect the aforementioned utilization, middleware, IDE and tools data from IaaS cloud 126 (see FIG. 1) using an operating system agent, and application agent, or a script scan, and may collect the aforementioned utilization, middleware, IDE and tools data from container cloud 128 (see FIG. 1) using cAdvisor, which is a running daemon that collects, aggregates, processes, and exports information about running containers.

In one embodiment, resource monitoring module 108 (see FIG. 1) uses the aforementioned monitored utilization, middleware, IDE, and tools data to output hosts (i.e., identifications of VMs and containers), CPU utilization, memory utilization, identifications of applications, middleware, IDE, and tools that are determined to be running on IaaS cloud 126 (see FIG. 1) and container cloud 128 (see FIG. 1), amount of CPU available, amount of memory available, and utilization run curves. Resource monitoring module 108 (see FIG. 1) sends the aforementioned output to placement manager module 106 (see FIG. 1).

In step 202, resource monitoring module 108 (see FIG. 1) may collect the aforementioned relationships among nodes data by regularly collecting VM/Container communication information and open port information using an operating system agent and a port scan, or by using an application agent. In one embodiment, resource monitoring module 108 (see FIG. 1) uses the aforementioned monitored data specifying relationships among VMs and containers to output a composition table that specifies the node relationships. Resource monitoring module 108 (see FIG. 1) sends the composition table to placement manager module 106 (see FIG. 1).

In step 202, resource monitoring module 108 (see FIG. 1) may collect the aforementioned user behavior data by regularly collecting cloud operation data from IaaS cloud 126 (see FIG. 1) and container cloud 128 (see FIG. 1) to output user behavior data including, for a particular VM or container and for a particular application, middleware, or IDE discovered, an average interval between VM starts or stops, an average interval between application updates, and an average interval between communications with other connected nodes. In one embodiment, resource monitoring module 108 (see FIG. 1) sends the aforementioned output of user behavior to placement manager module 106 (see FIG. 1), which subsequently uses predefined criteria to determine where a node is placed. For example, for an average interval of VM starts/stops that exceeds a threshold, placement manager module 106 (see FIG. 1) recommends moving the node from IaaS cloud 126 (see FIG. 1) to a container in container cloud 128 (see FIG. 1). As another example, for an average interval between communications with other nodes that exceeds a threshold, placement manager module 106 (see FIG. 1) recommends moving the node within the same network area, and may be the same zone in IaaS cloud 126 (see FIG. 1).

Prior to step 204, resource monitoring module 108 (see FIG. 1) sends the data monitored in step 202 to pattern management module 104 (see FIG. 1). In step 204, based on the data monitored in step 202, pattern management module 104 (see FIG. 1) updates pattern decision tree 124 (see FIG. 1). In one embodiment, in step 204, resource analytics module 114 (see FIG. 1) analyzes historic and continuous user behavior data, relationships among nodes, and infrastructure utilization data received from resource monitoring module 108 (see FIG. 1), and based on the analysis, generates and optimizes patterns of workloads and user behavior and directs pattern controller 122 (see FIG. 1) to update pattern decision tree 124 (see FIG. 1) in pattern repository 116 (see FIG. 1).

In step 206, requirement module 110 (see FIG. 1) receives a user request which specifies user requirements of computing resources that need to be newly placed in IaaS cloud 126 (see FIG. 1) or container cloud 128 (see FIG. 1). In embodiments of the present invention, the requirements of the computing resources include specifications of one or more of: (1) a business purpose, (2) CPU, memory and disk requirements, (3) middleware requirements, (4) software testing tool requirements, (5) IDE requirements, and (6) deployment duration requirements of the computing resources.

After step 206, requirement module 110 (see FIG. 1) sends the user requirements to placement manager module 106 (see FIG. 1). In step 208, based on (i) the user requirements in the user request received in step 206, (ii) a comparison by pattern controller 122 (see FIG. 1) of the user requirements to the patterns in pattern decision tree 124 (see FIG. 1) which was updated in step 204, and (iii) the data monitored in step 202, placement manager module 106 (see FIG. 1) generates an orchestration topology that specifies a new placement of one or more of the computing resources into IaaS cloud 126 (see FIG. 1) and another one or more of the computing resources into container cloud 128 (see FIG. 1). For example, an orchestration topology for a new placement of a node or an update of an existing placement may include: Node 1 on IaaS {Setting: host IP, CPU, Mem, Disk}; Node 2 on CaaS {Setting: Pod ID, CPU, Mem, Disk}; etc. Placement manager module 106 (see FIG. 1) sends the orchestration topology to deployment orchestration module 112 (see FIG. 1).

Alternatively, step 206 is omitted if a new computing resource placement in a cloud is not requested and instead unbalanced workload(s) are discovered. Prior to step 208, based on the data monitored in step 202, resource monitoring module 108 (see FIG. 1) identifies unbalanced workloads of already placed computing resources. Resource monitoring module 108 (see FIG. 1) sends an information specifying the unbalanced workloads to placement manager module 106 (see FIG. 1). Placement manager module 106 (see FIG. 1) compares the workloads to patterns in pattern decision tree 124 (see FIG. 1) in pattern repository 116 (see FIG. 1). Based on the comparison of the workloads to the patterns, placement manager module 106 (see FIG. 1) generates an orchestration topology in step 208.

In step 210, based on the orchestration topology generated in step 208, deployment orchestration module 112 (see FIG. 1) automatically deploys the one or more of the computing resources into IaaS cloud 126 (see FIG. 1) and automatically deploys the other one or more of the computing resources into container cloud 128 (see FIG. 1). In one embodiment, step 210 includes deployment orchestration module 112 (see FIG. 1) generating IaaS and CaaS images and configuration and deployment files. In one embodiment, step 210 includes deployment orchestration module 112 (see FIG. 1) deploying nodes via an invocation of a cloud API. The process of FIG. 2 ends at step 212.

In one embodiment, pattern management module 104 (see FIG. 1) determines the most common node relationship patterns in pattern decision tree 124 (see FIG. 1) and determines that the data monitored in step 202 does not include node relationships. For example, the most common node relationship patterns are the top ten (i.e., ten most common) combinations of middleware in IaaS cloud 126 (see FIG. 1) and container cloud 128 (see FIG. 1). In this case, in step 208, placement manager module 106 (see FIG. 1) generates the aforementioned orchestration topology based in part on a node relationship selected from the most common node relationship patterns.

In one embodiment, pattern management module 104 (see FIG. 1) determines or receives a utilization threshold amount and determines whether the utilization of the infrastructure specified by the data monitored in step 202 exceeds the utilization threshold amount. The utilization threshold amount is a result of machine learning from utilization data from cloud nodes. Pattern management module 104 (see FIG. 1) determines a pattern template that specifies a pattern in pattern decision tree 124 (see FIG. 1), where the pattern template is based on the utilization of the infrastructure and whether the utilization of the infrastructure exceeds the utilization threshold amount. In step 204, updating pattern decision tree 124 (see FIG. 1) is based in part on the utilization of the infrastructure, whether the utilization of the infrastructure exceeds the utilization threshold amount, and the pattern template.

In one embodiment, pattern management module 104 (see FIG. 1) determines a key performance indicator (KPI) threshold value for the user behavior specified by the data monitored in step 202. Pattern management module 104 (see FIG. 1) determines whether the user behavior data specified by the monitored data exceeds the KPI threshold value, and determines a user behavior score based at least in part on whether the user behavior data exceeds the KPI threshold value. In step 204, updating pattern decision tree 124 (see FIG. 1) is based in part on the user behavior score.

Examples

Figure 3A:
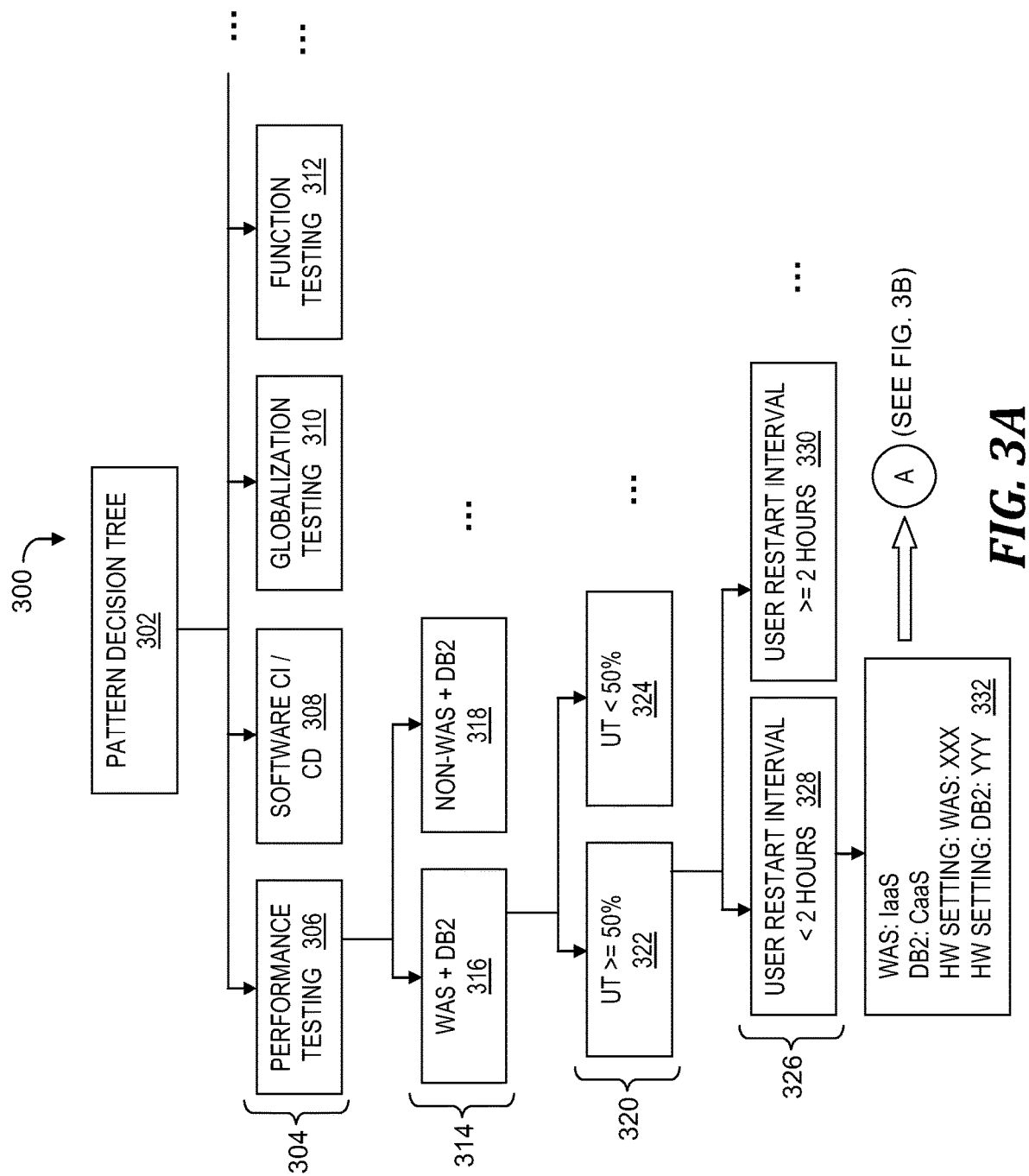
FIGS. 3A-3B depict an example of a pattern decision tree used in the process of FIG. 2, in accordance with embodiments of the present invention.
Figure 3B:
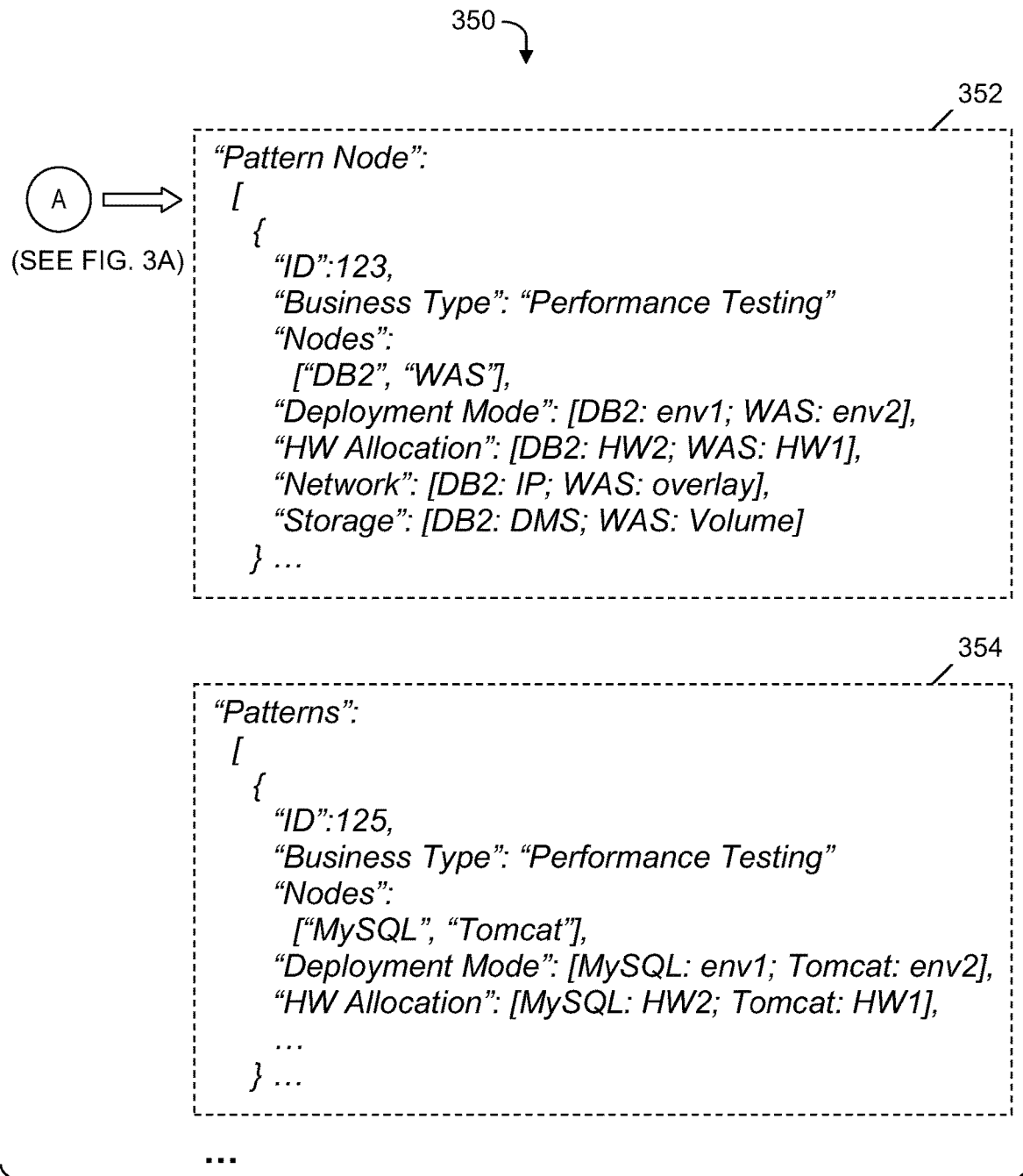

FIGS. 3A-3B depict an example of a pattern decision tree 300 used in the process of FIG. 2, in accordance with embodiments of the present invention. In FIG. 3A, pattern decision tree 300 includes a root node 302 and categories 304 of business purposes, which include performance testing 306, software continuous integration (CI)/continuous delivery (CD) 308, globalization testing 310, and function testing 312. Under performance testing 306, pattern decision tree 300 includes categories 314 of node relationships in environments, which include WAS+DB2 316 (i.e., an environment having a WebSphere® Application Server (WAS) and a DB2® database management system) and Non-WAS+DB2 318 (i.e., a non-WAS environment having a DB2® database management system). WebSphere® and DB2® are registered trademarks of International Business Machines Corporation located in Armonk, N.Y.

Under environment 316, pattern decision tree 300 includes categories 320 of utilization that include utilization 322 (i.e., UT>=50% or the utilization rate is greater than or equal to 50%) and utilization 324 (i.e., UT<50%). Under utilization 322, pattern decision tree 300 includes categories 326 of restart intervals that include interval 328 (i.e., user restart interval<2 hours) and interval 330 (i.e., user restart interval>=2 hours).

Based on a pattern that includes elements of pattern decision tree 300 in categories 304, 314, 320 and 326, a leaf node is associated with one of leaf node specifications 350 in FIG. 3B, where the leaf node specifications match the pattern and indicate an identifier, a business type, the node relationship in the environment, settings for an allocation of hardware, and network and storage settings.

Pattern decision tree 300 indicates that for a user request for deployment of a computing resource that will be used for performance testing 306, in a WAS+DB2 environment 316, with a UT>=50% utilization 322 and a user restart interval 328 (i.e., user restart interval<2 hours), then a leaf node 332 is associated with leaf node specification 352 in FIG. 3B rather than leaf node specification 354 in FIG. 3B, because leaf node specification 352 indicates a node relationship (i.e., "Nodes": ["DB2", "WAS"] in lines 6-7 of leaf node specification 352) that matches the WAS+DB2 environment 316 in FIG. 3A.

Computer System

FIG. 4 is a block diagram of a computer included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 and 416 for pattern management module 104 (see FIG. 1) and placement manager module 106 (see FIG. 1), respectively, to perform a method of orchestrating computing resources between different computing environments, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414 and 416) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414 and 416) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to orchestrate computing resources between different computing environments. Although FIG. 4 depicts memory 404 as including program code, the present invention contemplates embodiments in which memory 404 does not include all of code 414 simultaneously, but instead at one time includes only a portion of code 414, and embodiments in which memory 404 does not include all of code 416 simultaneously, but instead at one time includes only a portion of code 416.

Further, memory 404 may include an operating system (not shown) and may include other systems not shown in FIG. 4. In alternate embodiments, Storage unit 412 and/or one or more other computer data storage units (not shown) that are coupled to computer 102 may include data monitored by resource monitoring module 104 (see FIG. 1) and requirements provided by requirement module 110 (see FIG. 1). In an alternate embodiment, storage unit 412 may include pattern repository 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to orchestrating computing resources between different computing environments. Thus, an embodiment of the present invention discloses a process for supporting computer infrastructure, where the process includes providing at least one support service for at least one of integrating, hosting, maintaining and deploying computer-readable code (e.g., program code 414 and 416) in a computer system (e.g., computer 102) including one or more processors (e.g., CPU 402), wherein the processor(s) carry out instructions contained in the code causing the computer system to orchestrate computing resources between different computing environments. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of orchestrating computing resources between different computing environments.

While it is understood that program code 414 and 416 for orchestrating computing resources between different computing environments may be deployed by manually loading directly in client, server and proxy computers (not shown) via loading a computer-readable storage medium (e.g., computer data storage unit 412), program code 414 and 416 may also be automatically or semi-automatically deployed into computer 102 by sending program code 414 and 416 to a central server or a group of central servers. Program code 414 and 416 is then downloaded into client computers (e.g., computer 102) that will execute program code 414 and 416. Alternatively, program code 414 and 416 is sent directly to the client computer via e-mail. Program code 414 and 416 is then either detached to a directory on the client computer or loaded into a directory on the client computer by a button on the e-mail that executes a program that detaches program code 414 and 416 into a directory. Another alternative is to send program code 414 and 416 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 and 416 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of orchestrating computing resources between different computing environments. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414 and 416) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414 and 416) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414 and 416) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414 and 416).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414 and 416) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of orchestrating computing resources between different computing environments, the method comprising the steps of:

a computer monitoring data from a first computing environment and a second computing environment, the data specifying a utilization of infrastructure of the first and second computing environments, middleware running on the first and second computing environments, software testing tools running on the first and second computing environments, integrated development environments (IDEs) running on the first and second computing environments, relationships among nodes of the first and second computing environments and utilization of the nodes, and user behavior in the first and second computing environments;

based on the utilization of the infrastructure, the middleware, the software testing tools, the IDEs, the relationships among the nodes, the utilization of the nodes, and the user behavior, the computer updating a pattern decision tree;

based on the monitored data specifying the utilization of the infrastructure, the middleware, the software testing tools, the IDEs, the relationships among the nodes, the utilization of the nodes, and the user behavior, the computer identifying unbalanced workloads in computing resources placed in the first and second computing environments;

based on a comparison of the unbalanced workloads to patterns in the updated pattern decision tree, the computer generating an orchestration topology that specifies a new placement of the computing resources in the first and second computing environments; and based on the orchestration topology, the computer automatically deploying one or more computing resources included in the computing resources in the first computing environment and automatically deploying one or more other computing resources included in the computing resources in the second computing environment.

2. The method of claim 1, wherein the step of monitoring the data includes monitoring data from an infrastructure as a service (IaaS) cloud environment and monitoring other data from a container as a service (CaaS) cloud environment, wherein the step of updating the pattern decision tree is based on the monitored data from the IaaS cloud environment and the monitored other data from the CaaS cloud environment, wherein the step of deploying the one or more computing resources in the first computing environment includes deploying the one or more computing resources in the IaaS cloud environment, and wherein the step of deploying the one or more other computing resources in the second computing environment includes deploying the one or more other computing resources in the CaaS cloud environment.

3. The method of claim 1, further comprising the steps of:
the computer receiving user requirements specifying a business purpose, a central processing unit (CPU), a memory, a disk, middleware, a software testing tool, an integrated development environment, and a duration of the computing resources in the first or second computing environment; and
based on the received user requirements, the computer selecting a pattern in the pattern decision tree,
wherein the step of generating the orchestration topology is further based on the received user requirements and the selected pattern.

4. The method of claim 1, further comprising the step of the computer determining most common node relationship patterns in the pattern decision tree, wherein the step of generating the orchestration topology is based in part on one of the most common node relationship patterns.

5. The method of claim 1, further comprising the steps of:
the computer determining a utilization threshold amount;
the computer determining whether the utilization of the infrastructure specified by the monitored data exceeds the utilization threshold amount; and
based on the utilization of the infrastructure specified by the monitored data and based on whether the utilization of the infrastructure exceeds the utilization threshold amount, the computer determining a pattern template that specifies a pattern in the pattern decision tree,
wherein the step of updating the pattern decision tree is based in part on the utilization of the infrastructure, whether the utilization of the infrastructure exceeds the utilization threshold amount, and the pattern template.

6. The method of claim 1, further comprising the steps of:
the computer determining a key performance indicator (KPI) threshold value for the user behavior specified by the monitored data;
determining whether the user behavior specified by the monitored data exceeds the KPI threshold value; and
based in part on whether the user behavior exceeds the KPI threshold value, the computer determining a user behavior score,
wherein the step of updating the pattern decision tree is based in part on the user behavior score.

7. The method of claim 1, further comprising the step of:
providing at least one support service for at least one of creating, integrating, hosting, maintaining, and deploying computer readable program code in the computer, the program code being executed by a processor of the computer to implement the steps of monitoring the data, updating the pattern decision tree, identifying unbalanced workloads, generating the orchestration topology, automatically deploying the one or more computing resources, and automatically deploying the one or more other computing resources.

8. A computer program product, comprising:
a computer readable storage medium and a computer readable program code stored in the computer readable storage medium, the computer readable program code containing instructions that are executed by a central processing unit (CPU) of a computer system to implement a method of orchestrating computing resources between different computing environments, the method comprising the steps of:
the computer system monitoring data from a first computing environment and a second computing environment, the data specifying a utilization of infrastructure of the first and second computing environments, middleware running on the first and second computing environments, software testing tools running on the first and second computing environments, integrated development environments (IDEs) running on the first and second computing environments, relationships among nodes of the first and second computing environments and utilization of the nodes, and user behavior in the first and second computing environments;
based on the utilization of the infrastructure, the middleware, the software testing tools, the IDEs, the relationships among the nodes, the utilization of the nodes, and the user behavior, the computer system updating a pattern decision tree;
based on the monitored data specifying the utilization of the infrastructure, the middleware, the software testing tools, the IDEs, the relationships among the nodes, the utilization of the nodes, and the user behavior, the computer system identifying unbalanced workloads in computing resources placed in the first and second computing environments;
based on a comparison of the unbalanced workloads to patterns in the updated pattern decision tree, the computer system generating an orchestration topology that specifies a new placement of the computing resources in the first and second computing environments; and based on the orchestration topology, the computer system automatically deploying one or more computing resources included in the computing resources in the first computing environment and automatically deploying one or more other computing resources included in the computing resources in the second computing environment.

9. The computer program product of claim 8, wherein the step of monitoring the data includes monitoring data from an infrastructure as a service (IaaS) cloud environment and monitoring other data from a container as a service (CaaS) cloud environment, wherein the step of updating the pattern decision tree is based on the monitored data from the IaaS cloud environment and the monitored other data from the CaaS cloud environment, wherein the step of deploying the one or more computing resources in the first computing environment includes deploying the one or more computing resources in the IaaS cloud environment, and wherein the step of deploying the one or more other computing resources in the second computing environment includes deploying the one or more other computing resources in the CaaS cloud environment.

10. The computer program product of claim 8, wherein the method further comprises the steps of:

the computer system receiving user requirements specifying a business purpose, a central processing unit (CPU), a memory, a disk, middleware, a software testing tool, an integrated development environment, and a duration of the computing resources in the first or second computing environment; and based on the received user requirements, the computer system selecting a pattern in the pattern decision tree, wherein the step of generating the orchestration topology is further based on the received user requirements and the selected pattern.

11. The computer program product of claim 8, wherein the method further comprises the step of the computer system determining most common node relationship patterns in the pattern decision tree, wherein the step of generating the orchestration topology is based in part on one of the most common node relationship patterns.

12. The computer program product of claim 8, wherein the method further comprises the steps of:

the computer system determining a utilization threshold amount;

the computer system determining whether the utilization of the infrastructure specified by the monitored data exceeds the utilization threshold amount; and based on the utilization of the infrastructure specified by the monitored data and based on whether the utilization of the infrastructure exceeds the utilization threshold amount, the computer system determining a pattern template that specifies a pattern in the pattern decision tree, wherein the step of updating the pattern decision tree is based in part on the utilization of the infrastructure, whether the utilization of the infrastructure exceeds the utilization threshold amount, and the pattern template.

13. The computer program product of claim 8, wherein the method further comprises the steps of:

the computer system determining a key performance indicator (KPI) threshold value for the user behavior specified by the monitored data;

determining whether the user behavior specified by the monitored data exceeds the KPI threshold value; and based in part on whether the user behavior exceeds the KPI threshold value, the computer system determining a user behavior score, wherein the step of updating the pattern decision tree is based in part on the user behavior score.

14. A computer system comprising:

a central processing unit (CPU);

a memory coupled to the CPU; and a computer readable storage medium coupled to the CPU, the computer readable storage medium containing instructions that are executed by the CPU via the memory to implement a method of orchestrating computing resources between different computing environments, the method comprising the steps of:

the computer system monitoring data from a first computing environment and a second computing environment, the data specifying a utilization of infrastructure of the first and second computing environments, middleware running on the first and second computing environments, software testing tools running on the first and second computing environments, integrated development environments (IDEs) running on the first and second computing environments, relationships among nodes of the first and second computing environments and utilization of the nodes, and user behavior in the first and second computing environments;

based on the utilization of the infrastructure, the middleware, the software testing tools, the IDEs, the relationships among the nodes, the utilization of the nodes, and the user behavior, the computer system updating a pattern decision tree;

based on the monitored data specifying the utilization of the infrastructure, the middleware, the software testing tools, the IDEs, the relationships among the nodes, the utilization of the nodes, and the user behavior, the computer system identifying unbalanced workloads in computing resources placed in the first and second computing environments;

based on a comparison of the unbalanced workloads to patterns in the updated pattern decision tree, the computer system generating an orchestration topology that specifies a new placement of the computing resources in the first and second computing environments; and based on the orchestration topology, the computer system automatically deploying one or more computing resources included in the computing resources in the first computing environment and automatically deploying one or more other computing resources included in the computing resources in the second computing environment.

15. The computer system of claim 14, wherein the step of monitoring the data includes monitoring data from an infrastructure as a service (IaaS) cloud environment and monitoring other data from a container as a service (CaaS) cloud environment, wherein the step of updating the pattern decision tree is based on the monitored data from the IaaS cloud environment and the monitored other data from the CaaS cloud environment, wherein the step of deploying the one or more computing resources in the first computing environment includes deploying the one or more computing resources in the IaaS cloud environment, and wherein the step of deploying the one or more other computing resources in the second computing environment includes deploying the one or more other computing resources in the CaaS cloud environment.

16. The computer system of claim 14, wherein the method further comprises the steps of:
    the computer system receiving user requirements specifying a business purpose, a central processing unit (CPU), a memory, a disk, middleware, a software testing tool, an integrated development environment, and a duration of the computing resources in the first or second computing environment; and
    based on the received user requirements, the computer system selecting a pattern in the pattern decision tree,
    wherein the step of generating the orchestration topology is further based on the received user requirements and the selected pattern.

17. The computer system of claim 14, wherein the method further comprises the steps of:
    based on the monitored data, the computer system identifying an unbalanced workload in the first or second computing environment; and
    based on the identified unbalanced workload, the computer system selecting a pattern in the pattern decision tree,
    wherein the step of generating the orchestration topology is further based on the identified unbalanced workload and the selected pattern.

18. The computer system of claim 14, wherein the method further comprises the step of the computer system determining most common node relationship patterns in the pattern decision tree, wherein the step of generating the orchestration topology is based in part on one of the most common node relationship patterns.

19. The computer system of claim 14, wherein the method further comprises the steps of:
    the computer system determining a utilization threshold amount;
    the computer system determining whether the utilization of the infrastructure specified by the monitored data exceeds the utilization threshold amount; and
    based on the utilization of the infrastructure specified by the monitored data and based on whether the utilization of the infrastructure exceeds the utilization threshold amount, the computer system determining a pattern template that specifies a pattern in the pattern decision tree,
    wherein the step of updating the pattern decision tree is based in part on the utilization of the infrastructure, whether the utilization of the infrastructure exceeds the utilization threshold amount, and the pattern template.

20. The computer system of claim 14, wherein the method further comprises the steps of:
    the computer system determining a key performance indicator (KPI) threshold value for the user behavior specified by the monitored data;
    determining whether the user behavior specified by the monitored data exceeds the KPI threshold value; and
    based in part on whether the user behavior exceeds the KPI threshold value, the computer system determining a user behavior score,
    wherein the step of updating the pattern decision tree is based in part on the user behavior score.

* * * * *